United States Patent
Thilagar et al.

(10) Patent No.: US 8,516,313 B2
(45) Date of Patent: Aug. 20, 2013

(54) SHARED ERROR SEARCHING

(75) Inventors: Parthiban Thilagar, Hollis, NH (US); Raymond Lawrence Pfau, Bolton, MA (US); Richard James Anderson, Jr., Nashua, NH (US); William Alan Wright, Bedford, NH (US); Joseph Edward Errede, Londonderry, NH (US); Patrick H. Fry, Brookline, NH (US)

(73) Assignee: Oracle International Corporation, Redwood Shores, CA (US)

( * ) Notice: Subject to any disclaimer, the term of this patent is extended or adjusted under 35 U.S.C. 154(b) by 5 days.

(21) Appl. No.: 12/816,422

(22) Filed: Jun. 16, 2010

(65) Prior Publication Data

US 2011/0314329 A1  Dec. 22, 2011

(51) Int. Cl.
*G06F 11/00* (2006.01)
(52) U.S. Cl.
USPC .................................................. 714/48
(58) Field of Classification Search
USPC ............... 714/48, 25, 1, 746–824; 380/4
See application file for complete search history.

(56) References Cited

U.S. PATENT DOCUMENTS

| | | | | |
|---|---|---|---|---|
| 5,694,401 A * | 12/1997 | Gibson | | 714/728 |
| 6,023,536 A * | 2/2000 | Visser | | 382/310 |
| 6,345,322 B1 * | 2/2002 | Humphrey | | 710/38 |
| 6,598,178 B1 * | 7/2003 | Yee et al. | | 714/34 |
| 6,694,454 B1 * | 2/2004 | Stanley | | 714/30 |
| 7,213,176 B2 * | 5/2007 | Banko | | 714/38.12 |
| 2004/0187048 A1 * | 9/2004 | Angamuthu et al. | | 714/27 |
| 2008/0320167 A1 * | 12/2008 | Collignon | | 709/245 |

* cited by examiner

*Primary Examiner* — Amine Riad
(74) *Attorney, Agent, or Firm* — Kraguljac Law Group, LLC/Oracle

(57) ABSTRACT

Systems, methods, and other embodiments associated with shared error searching for web resource requests are described. A web resource request that includes one or more request strings is received and a error detection directive that identifies a first type of error to be located in a specified request string component is accessed. At least a portion of a first request string that corresponds to the specified request string component is searched, in a single pass, for the first type of error and other types of errors. Results with respect to the first error type are returned while occurrences of the first and other types of errors for are recorded for responding to subsequent error detection directives. Thus, a subsequent error detection directive for the other types of errors in the first request string component may be processed without re-searching the portion of the first request string already searched with respect to the first error detection directive.

23 Claims, 7 Drawing Sheets

SHARED ERROR SEARCHING

BACKGROUND

Often unauthorized access to web resources is gained by users who submit an HTTP request that includes one or more malicious elements that will perform unauthorized operations when they are acted upon by the server. These unauthorized operations may retrieve protected data or tie up resources so that authorized requests may not be served. One of many techniques for gaining unauthorized access to web resources by way of an HTTP request is to embed a null byte in the HTTP request. While the null byte may have no effect in the initial stages of request processing, when the HTTP request string is acted upon by high level code in the web application, such as C or C++, the null byte may be interpreted as a string terminator. This causes unusual and unpredictable behavior, which may result in protected data being returned to the user who issued the malicious request.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. In addition, any number of string components and error types may be processed by the invention.

DETAILED DESCRIPTION

Many web application and cache servers perform a format check on HTTP requests and deny access to requests that have an improper format (e.g. include a null byte, or other improper elements). A typical HTTP request includes several string components, such as an address, a query string, and post body. If multiple types of improper request format are being detected, the error detection involves separately scanning the several string components for each type of improper request format.

As described herein, shared error searching detects errors in web resource requests with fewer search operations by combining work to be done into a single search. Shared error searching includes progress and results tracking mechanisms to keep track of error detection efforts already performed with respect to a given web resource request. In this manner, a portion of a web resource request that has already been checked for errors need not be re-checked to respond to a subsequent error detection directive. For the purposes of this description, format errors in an HTTP request having an address string component, a query string component, and a post body string component are detected using shared error searching. It will be apparent to one of skill in the art that the techniques and systems described herein may also be employed to detect other types of errors in other types of resource requests and/or string components.

"Logic", as used herein, includes but is not limited to hardware, firmware, computer executable instructions stored on a computer-readable medium, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
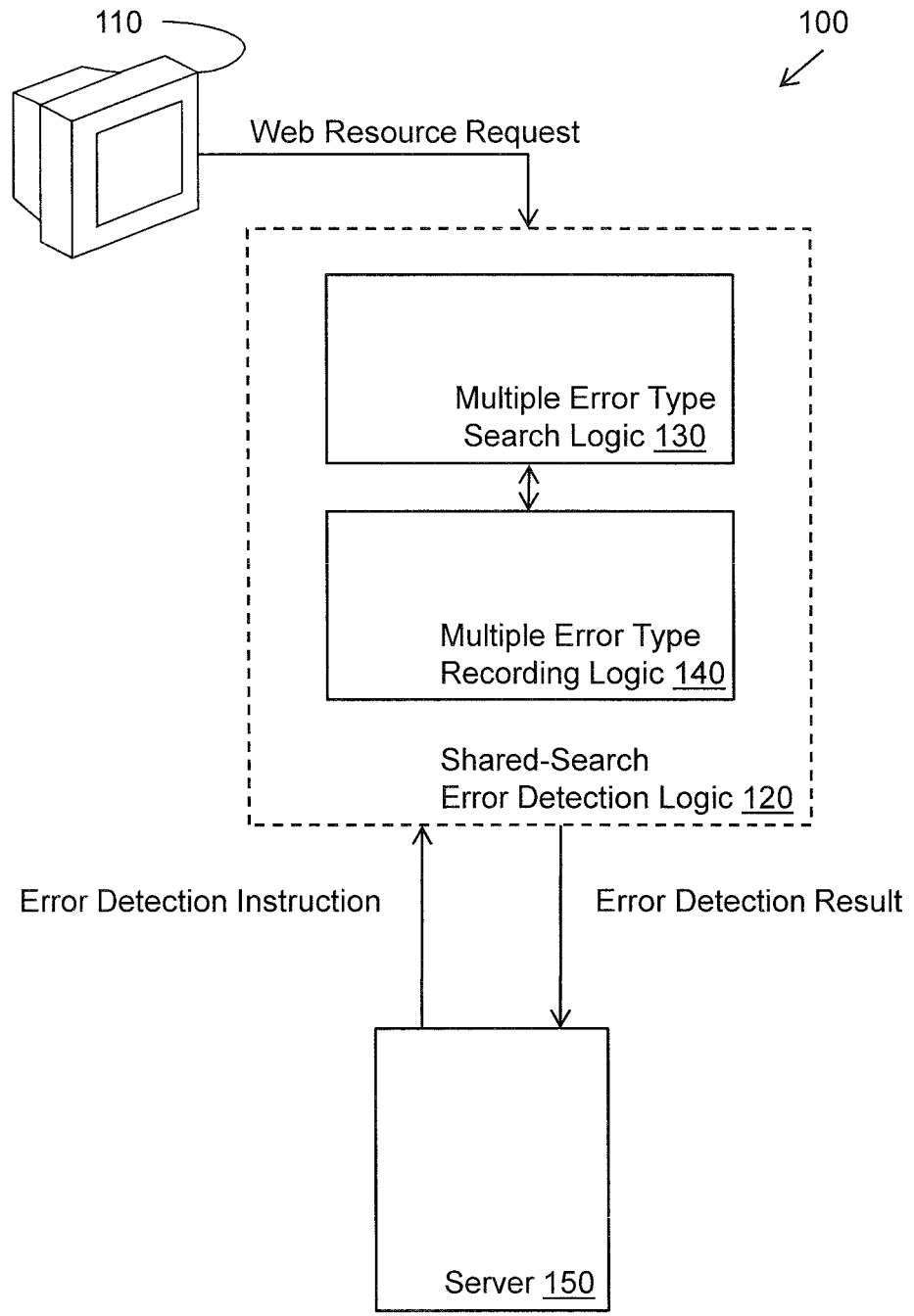
FIG. 1 illustrates an example embodiment of a system associated with shared error searching for detecting errors in web resource requests.

FIG. 1 illustrates an example embodiment of a shared error detection system 100. The system 100 is disposed between a user 110 and a server 150 and serves to screen out improper web resource requests before they are processed by the server. A shared-search error detection logic 120 receives a web resource request from the user 110 and also accesses an error detection directive that may be provided by a server 150 (or other application that screens requests). The error detection directive identifies a first type of error to be located in a first request string component. For example, the error detection directive may specify that the URL address string component of all incoming HTTP requests is to be checked for a null byte.

The shared-search error detection logic 120 is configured to determine if a first request string component as specified in the error detection directive has already been searched in a prior search for the first type of error and to return results recorded for the prior search without re-searching the first request string. Thus, in the example, the shared-search error detection logic will determine if the URL address of the received HTTP request has been searched for a null byte. If the URL address has been searched for a null byte, the shared-search error detection logic returns the result of the previous search without re-searching the HTTP request. As will be discussed in more detail below, returning of results may include allowing a request to progress to the server, denying the request before it reaches the server, logging the result, and so on.

The shared-search error detection logic 120 may also include a multiple error type search logic 130 that searches, in a single pass, at least a portion of a first request string characterized by the first request string type for the first type of error and other types of errors. In the example, the multiple error type search logic 130 searches the URL address for a null byte and in the same pass also searches for at least one other type of format error, such as strict encoding, double encoding, and/or valid Unicode.

The shared-search error detection logic 120 may also include a multiple error recording logic 140 that records occurrences of the first and other types of errors for responding to subsequent error detection directives for the other types of errors. In the example, the multiple error type recording logic 140 records the results of the search of the URL address for a null byte and other types of format error, such as strict encoding, double encoding, and/or valid Unicode.

The shared-search error detection logic 120 generates results for the search of the first request string component for the first type of error. In the example, if a null byte is detected in the URL address, this result is returned by the shared-search error detection logic 120. By virtue of the recording of results for the other types of errors, the shared-search error detection logic 120 will also be able to return results for a subsequent error detection directive for the other types of errors in the first request string component without re-searching the portion of the first request string component already searched with respect to the first error detection directive.

Results for an error detection directive can be returned in many ways. For the purposes of this description, a "pass" result indicates that a web resource request meets error detection requirements and normal processing of the request should continue. A "fail" result indicates that an error has been detected. The shared error searching system 100 may deny service in the event of a fail result or take any other configured course of action, such as logging the result or sending an alert message to an administrator.

Figure 2:
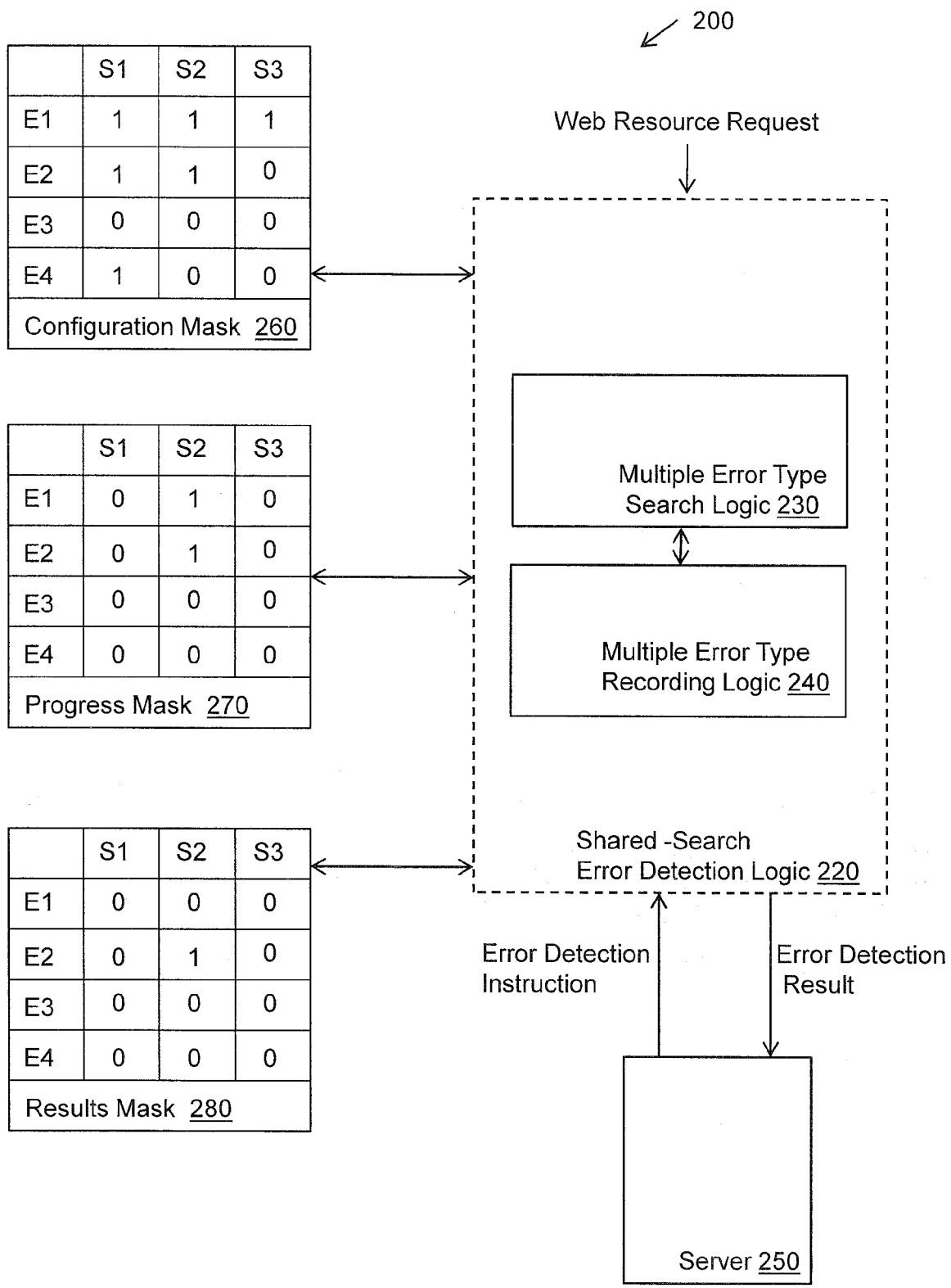
FIG. 2 illustrates another example embodiment of a system associated with shared error searching for detecting errors in web resource requests.

FIG. 2 illustrates an example embodiment of a shared error searching system 200 that maintains various tracking mechanisms to facilitate shared error searching. The shared error searching system includes a shared-search error detection logic 220 that includes a multiple error type search logic 230 and a multiple error type recording logic 240 that function in a similar manner as described above in connection with the multiple error type search logic 130 and multiple error type recording logic 140, respectively. The shared-search error detection logic maintains a configuration mask 260 that specifies one or more types of errors to be detected in one or more request string components. The configuration mask maps multiple types of errors (e.g., E1-E4) such as null byte, and so on, to multiple string components (e.g. S1-S3) such as a URL address string, and so on. This configuration mask can be set, for example, by a system administrator by means of a command-line or graphical interface and is used to define the types of errors to be searched for each string component by the shared error searching system 200. In the illustrated embodiment, the configuration mask is applied with respect to all incoming web resource requests.

In the illustrated configuration mask 260 string component S1 (e.g., URL address) is to be searched for error type E1 (e.g., null byte), E2 (e.g., strict encoding), and E4 (e.g., valid Unicode). String component S1 is not to be checked for error type E3 (e.g., double encoding). String component S2 (e.g., query string) is to be checked for error types E1 and E2 and not error types E3 or E4 while string component S3 (e.g., post body) is to be checked only for error type E1 (e.g., null byte). While binary type masks are shown for the purposes of illustration, it will be apparent to one of skill in the art that other mechanisms may be employed to store a configuration that specifies the types of errors to be searched for in the various string components.

The multiple error type search logic 230 is configured to search, in a single pass, at least a portion of a request string for the one or more types of errors specified for the request string component in the configuration mask. Thus, the multiple error type search logic 230 does not search a request string component for error types that are not identified in the configuration mask for that particular request string component.

The multiple error type recording logic 240 maintains a progress mask 270 that is associated with the web resource request. The progress mask records an indication as to which, if any, of the one or more request string components of the given web resource request has been searched for any of the one or more types of errors. The progress mask 270 indicates that string type S2 has already been searched for error types E1 and E2. The shared-search error detection logic 220 is configured to access the progress mask when it receives an error detection directive. If the progress mask indicates that the request string component specified by the error detection directive has not been searched for the error type specified by the error detection directive, the multiple error type search logic 230 searches, in a single pass, at least a portion of the request string component for the one or more types of errors specified for the request string component in the configuration mask.

The multiple error type recording logic 240 records the results of searches of request string components for the configured error types in a results mask 280 associated with the web resource request. The results mask 280 maps the one or more types of errors to the one or more request string components and indicates where errors have been found. For example, the results mask 280 indicates that an E2 type error has already been detected in string component S2. If the progress mask 270 indicates that a request string component has been searched for an error type specified in a received error detection directive, the shared-search error detection logic returns the result of the search of the request string component for the specified error type that is recorded in the error detection results mask without re-searching the request string component.

Figure 3A:
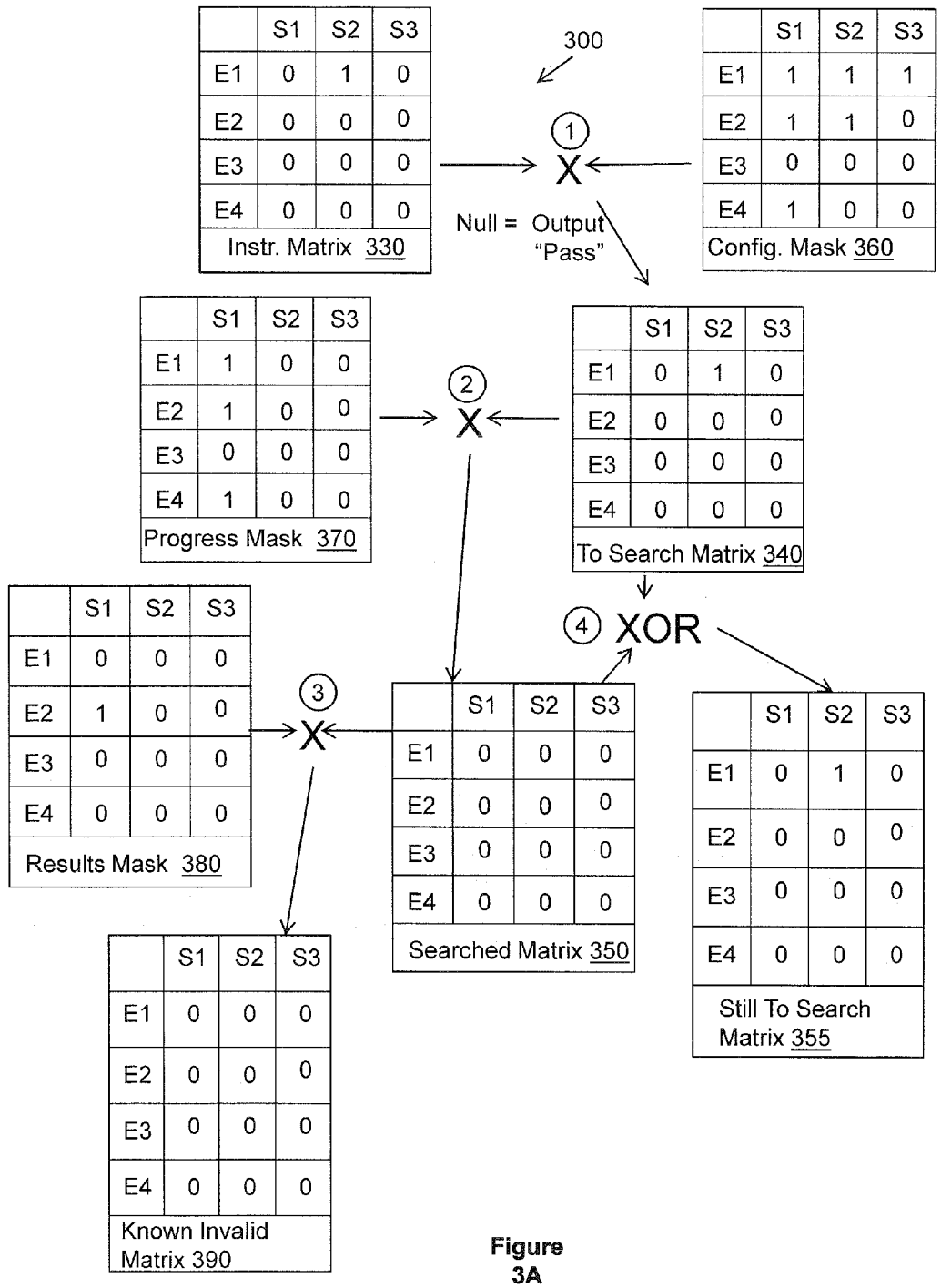
FIGS. 3A and 3B illustrate two examples of shared error searching for detecting errors in web resource requests
Figure 3B:
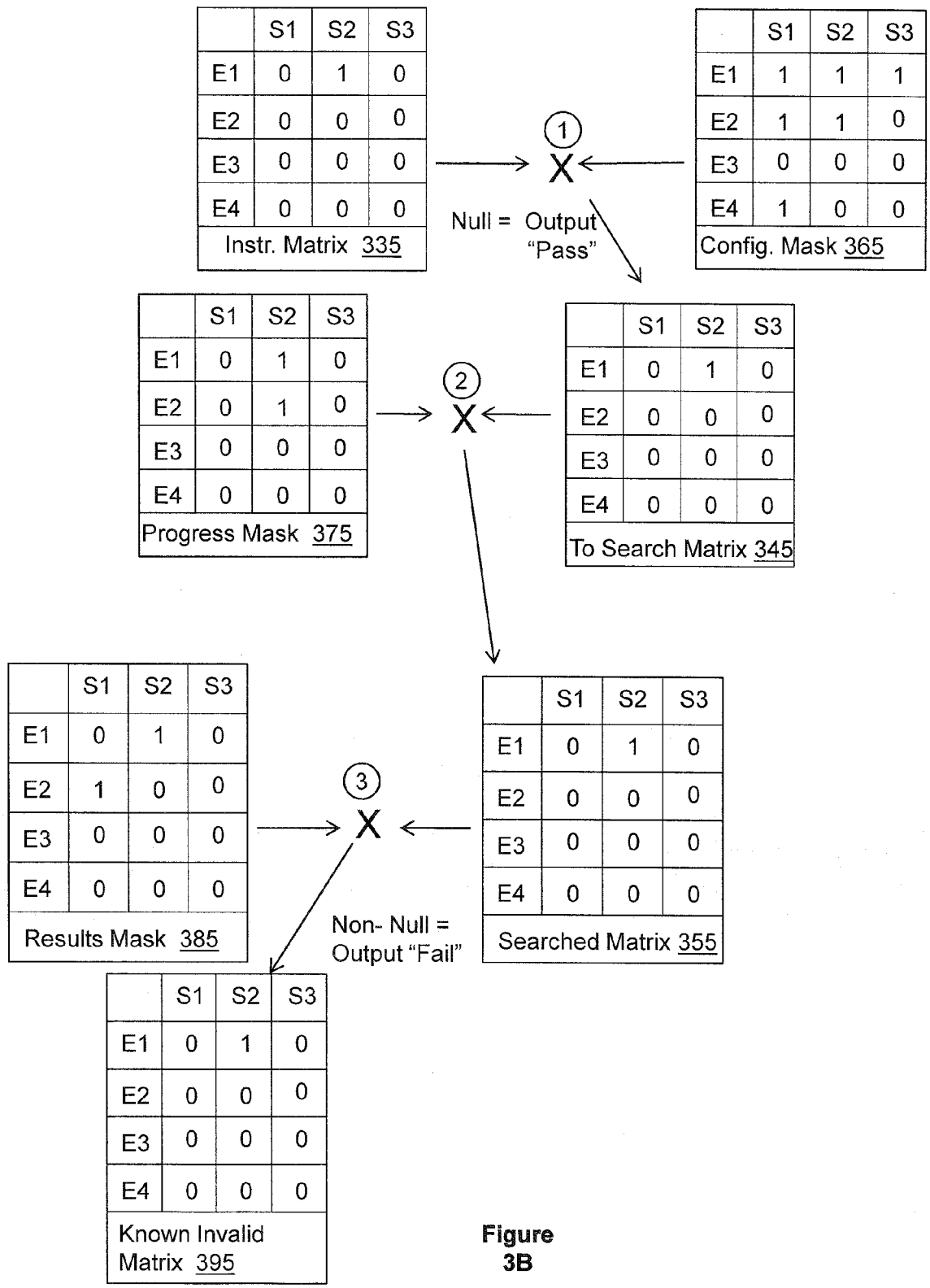

FIGS. 3A and 3B illustrate examples of shared error searching processing using a number of binary masks and matrices. Referring first to FIG. 3A, the process starts with an existing Configuration mask 360 that has already been set up by an administrator, as well as an existing Progress mask 370 and an existing Results mask 380 that are associated with the particular web resource request currently being processed. An Instruction matrix 330 is received that records an error detection directive that specifies that string component S2 should be searched for error type E1.

A first AND operation is performed on the Instruction matrix 330 the Configuration mask 360 to output a To Search matrix 340 that indicates which specific string components should be checked for which error type for this error detection directive. If the To Search matrix 340 has all null values, then no searching is necessary and a "pass" is output so that processing of the request will continue. In the illustrated embodiment, the To Search matrix 340 indicates that string component S2 should be searched for error type E1.

A second AND operation is performed on the To Search matrix 340 and the Progress mask 370 to output a Searched matrix 350 that indicates which of the error types have already been searched for the string component in the error detection directive. In the illustrated embodiment, the Searched matrix indicates that the string component specified by the error detection directive has not yet been searched for the error type specified by the error detection directive. A third AND operation is performed on the Searched matrix 350 and the Results mask 380 to output a Known Invalid matrix 390 that indicates whether the specified error type has been found in the specified string component. In the illustrated embodiment, while the Results mask indicates that an error type E2 has been found in string component S1, the Known Invalid Matrix has null entries which will result in a "pass" result. This is because the error type (e.g., E1) specified by the error detection directive has not yet been found in the string component (e.g., S2) specified by the error detection directive. In other embodiments, the system may output a "fail" result if the Results mask indicates that an error of any type, including an error type that is not specified in the present error detection directive, has been found in any string component. In some embodiments, the third AND operation may be skipped if the Searched Matrix has all null entries, because if the Searched Matrix has all null entries it follows that the Known Invalid Matrix will also have all null entries.

An XOR (exclusive OR) operation is performed between the To Search Matrix 340 and the Searched matrix 350 to determine which string components are still left to search. In the illustrated example, the XOR will output a non-null value for string component S2 as shown in the Still to Search Matrix 355. The shared error searching system 300 will then search, in a single pass, string component S2 in the web resource request for all of the error types specified in the Configuration mask (e.g., E1 and E2). The shared error searching system 300 will record the results of the search in the Results mask 380, indicate that the string component has been searched in the Progress mask 370, and return a result to the error detection directive.

Referring now to FIG. 3B, another example is illustrated. The process starts with an existing Configuration mask 365 that has already been set up by an administrator, as well as an existing Progress mask 375 and an existing Results mask 385 that are associated with the particular web resource request currently being processed. An Instruction matrix 335 is received that records an error detection directive that specifies that string type S2 should be searched for error type E1.

A first AND operation is performed on the Instruction matrix 335 and the Configuration mask 365 to output a To Search matrix 345 that indicates which specific string components should be checked for which error type for this error detection directive. In the illustrated embodiment, the To Search matrix 345 indicates that string component S2 should be searched for error type E1.

A second AND operation is performed on the To Search matrix 345 and the Progress mask 375 to output a Searched matrix 355 that indicates which of the error types have already been searched for the string component in the error detection directive. In the illustrated embodiment, the Searched matrix indicates that the string component S2 specified by the error detection directive has been searched for the error type E1 specified by the error detection directive. A third AND operation is performed on the Searched matrix 355 and the Results mask 385 to output a Known Invalid matrix 395 that indicates whether the specified error type has been found in the specified string component. In the illustrated embodiment, the Results mask indicates that an error type E2 has been found in string component S1 and an error type E1 has been found in String component S2. Thus, the Known Invalid Matrix has a non-null entry because the error type (e.g., E1) specified by the error detection directive has already been found in the string component (e.g., S2) specified by the error detection directive. In this case, a "fail" result is returned to the error detection directive without any further searching or processing.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Figure 4:
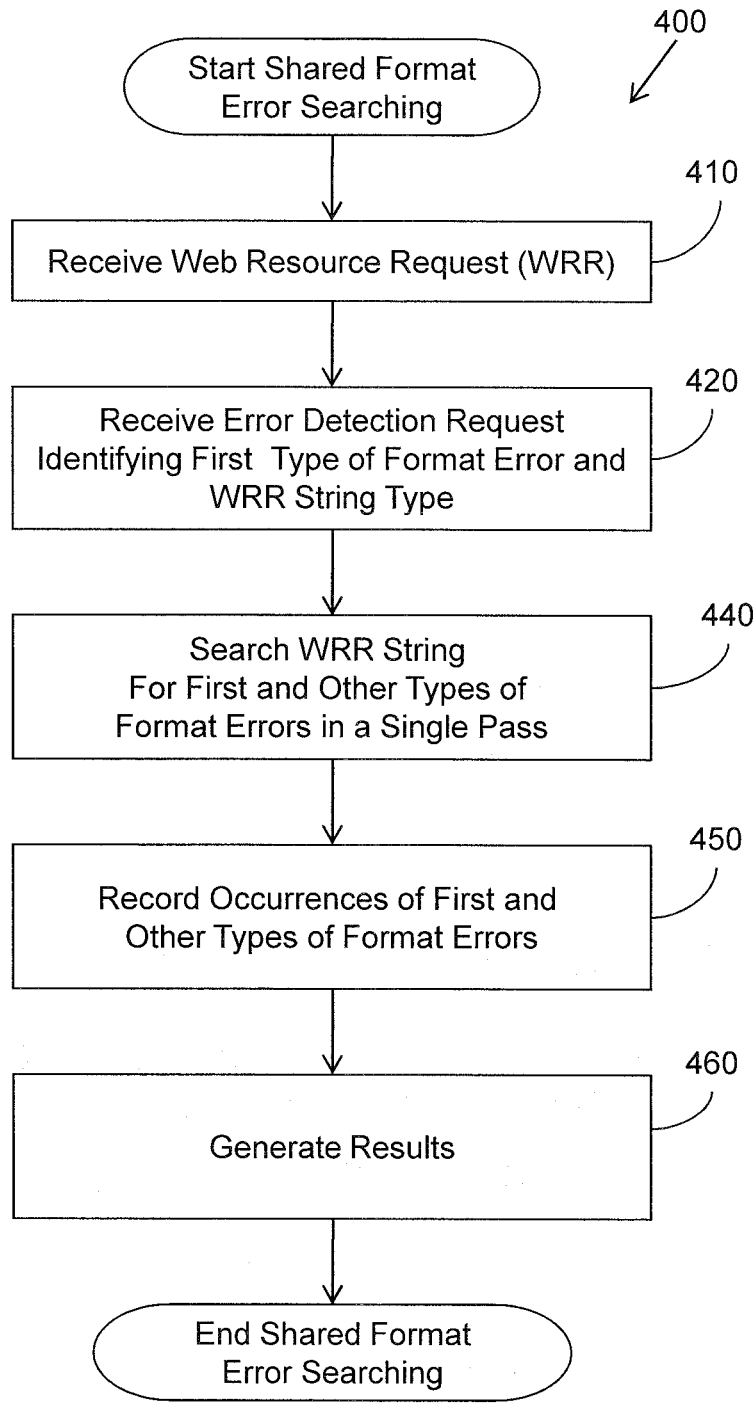
FIG. 4 illustrates an example embodiment of a method associated with shared error searching for detecting errors in web resource requests.

FIG. 4 illustrates an example embodiment of a shared format error searching method 400 that performs shared error searching on a web resource request. At 410 the method includes receiving a web resource request that includes one or more request string components. At 420 a first error detection directive is received that identifies a first type of error to be located in a first request string component. At 440, the method includes searching, in a single pass, at least a portion of the first request string component specified by the error detection directive for the first type of error and other types of errors. At 450 occurrences of the first and other types of errors are recorded for the first request string component, for responding to subsequent error detection directives for the other types of errors. In this manner, a subsequent error detection directive for at least one of the first and other types of errors in the first request string component can be processed without re-searching the portion of the first request string component already searched with respect to the first error detection directive. At 460 results of the search of the first request string for the first type of error are returned.

Figure 5:
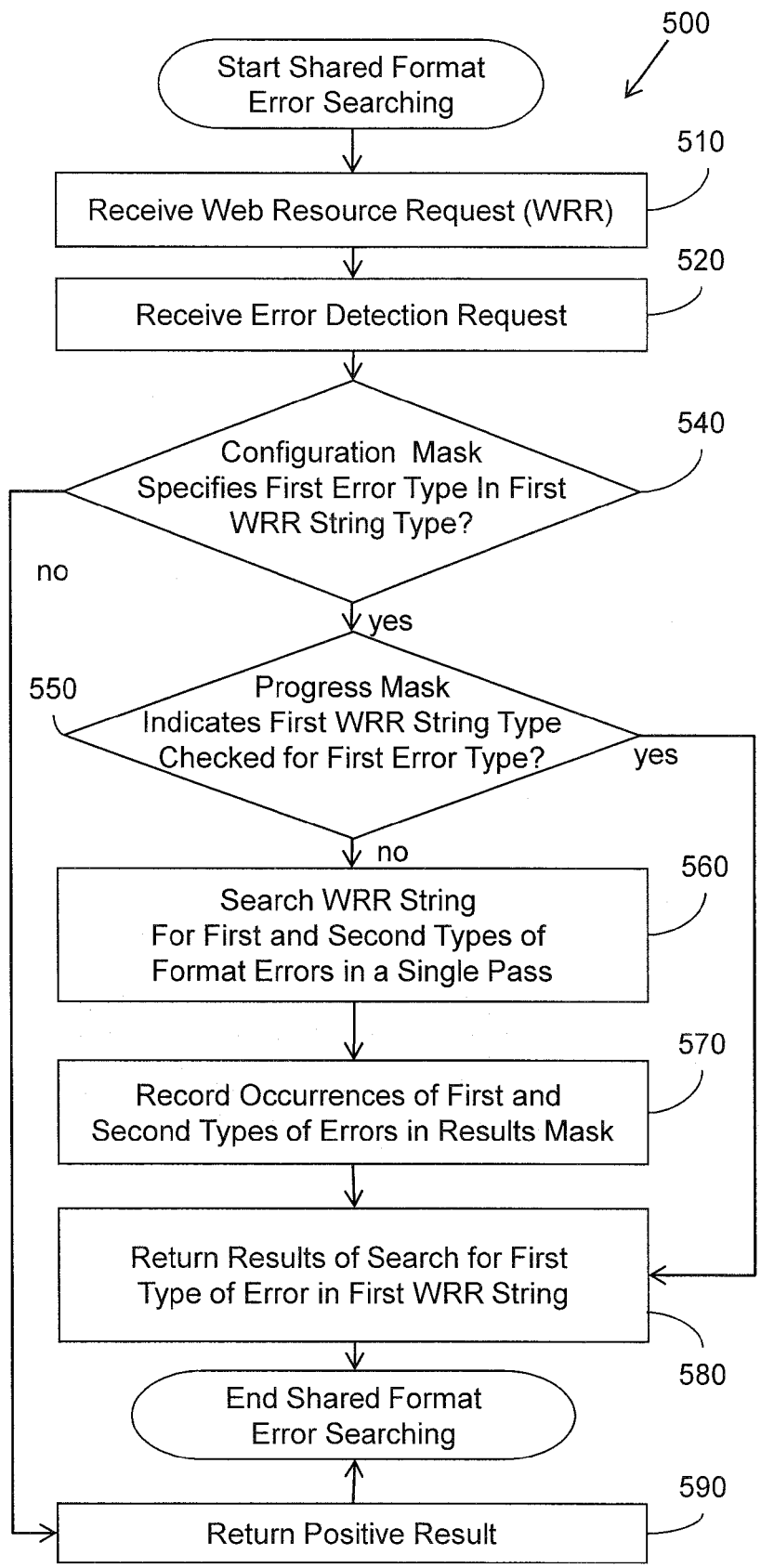
FIG. 5 illustrates another example embodiment of a method associated with shared error searching for detecting errors in web resource requests.

FIG. 5 illustrates another example embodiment of a shared format error searching method 500 that performs shared format error searching on a web resource request. At 510 the method includes receiving a first web resource request that includes one or more request strings. At 520 first error detection directive associated with the first web resource request is received that identifies a first type of error to be located in a first request string component. At 530, a configuration mask is accessed and if a search for the first type of error in the first string component is not specified by the configuration mask, at 590 a "pass" result is returned. If the configuration mask specifies searching for the first type of error in the first string component, at 550 a progress mask is checked to see if the first string component has already been searched for the first type of error. If the first string component has already been checked for the first type of error at 580 a previously recorded result for the first type of error in the first string component is returned.

If the progress mask indicates that the first string component has not been searched for the first type of error, at 560 the method includes searching, in a single pass, at least a portion of the first request string component for the first type of error and a second type of error. At 570 occurrences of the first and second types of errors are recorded for responding to subsequent error detection directives for the second type of error. In this manner, a subsequent error detection directive for the second type of error in the first request string component can be processed without re-searching the portion of the first request string component already searched with respect to the first error detection directive. At 580 results of the search of the first request string component for the first type of error are returned.

While FIGS. 4 and 5 illustrate various actions occurring in serial, it is to be appreciated that various actions illustrated in FIGS. 4 and 5 could occur substantially in parallel with additional synchronization mechanisms. By way of illustration, a first process could receive error detection directives, a second process could perform shared error searching, and a third process could record results of shared error searching. While three processes are described, it is to be appreciated that a greater and/or lesser number of processes could be employed and that lightweight processes, regular processes, threads, and other approaches could be employed. Multiple error types and/or multiple string components may be checked in a single invocation of shared error searching. This could be handled by breaking up the current invocation into multiple invocations, one for each error type requested, and then further to one for each string component requested.

The methods and systems described herein include searching, in a single pass, a request string for at least two types of format errors. Searching in a single pass may be performed by moving a pointer along the request string component and, at each character, checking for each of the at least two types of format errors. As the pointer moves, any detected errors are recorded. This recording may be performed by recording an offset within the string and a length of the error. If a type of error specified by an error detection directive is encountered, the pass of the string may be discontinued and a "fail" result may be output. In other embodiments, such as the monitor only mode, the pass of the string may be continued after the error has been detected until the end of the string is reached to allow for a complete check for all configured error types before outputting the "fail" result.

In some instances, a modified version of the string needs to be searched. For example, a search for invalid encoding may be performed on a decoded string. In this case, the decoded string may be treated as a separate string component for the purposes of shared error searching.

In some example embodiments, a subset of string components configured to be searched may be searched in the order in which they become available. For example, if the configuration mask designates that the address string component and the post body string component are to be checked for a given error type, a first search may search the address, which is typically received before the post body. A subsequent search may search the post body once it becomes available.

The action taken by a shared error searching system in response to detection of an error may be set according to several options. For example, in a first embodiment, the shared error searching system may be set up to pass through the string component and record errors of any of the error types configured by the administrator until the specified error type is detected, at which time, the search terminates and a "fail" result is returned. In some embodiments, only the first occurrence of each error type is recorded, and it may be efficient in these instances to set the shared error search up to only search for the types of errors that have not yet been detected in the string component. In other embodiments, all occurrences of errors are recorded so that multiple occurrences of any errors in a single string component may be captured. An array or linked list of error locations may be employed to record multiple occurrences of various error types.

According to another embodiment, once any error is detected in a string component (regardless of which type of error has been specified), the shared error search system reports the error and stops its pass of the string component. If the error type that was found is the specified error, then a "fail" result will be produced. If the error type that was found is not the specified error, then a "pass" result will produced. However, on a subsequent error detection directive that specifies the detected error type, a "fail" result will be produced without re-searching the string. In this embodiment, processing of subsequent error detection directives simply report the result for the error from the known invalid matrix. Once an error detection directive is received that specifies the detected error type, the "fail" result will be produced.

Another embodiment is the monitor only mode, which was already described briefly above. In this mode, selected (or all) error types are recorded without producing a "fail" result. For this case, when the shared error searching detects an error set to a monitor only mode it will continue searching the string component for the other error types until it finishes parsing the string component or detects an error type that is configured to produce a "fail" result. If an error type is detected that results in a "fail" result, a location of the pointer at the time the search ceased may be recorded so that in subsequent checks, a search for the monitor only mode error type may be continued where it left off. A flag can be used to indicate that a particular string component has been checked for a monitor only mode error type.

In one example, a method may be implemented as computer executable instructions. Thus, in one example, a computer-readable medium may store computer executable instructions that if executed by a machine (e.g., processor) cause the machine to perform a method that includes accessing an error detection directive associated with a web resource request that specifies one or more request string components to be searched for one or more error types.

The method may also include performing a first AND operation on the error detection directive and a configuration mask and if the first AND operation outputs a null result, returning a "pass" result indicating that the request string meets error detection specifications. For the purposes of this description, a null result is an all 0 result while a non-null result is a result that contains at least one non-zero (i.e., one) in the result. The method may also include, if the first AND operation does not output a null result, performing a second AND operation on the results of the first AND operation and a progress mask and performing a third AND operation on the results of the second AND operation and a results mask and if the third AND operation outputs a non-null result, returning a "fail" result indicating the request string does not meet error detection requirements.

The method may also include, if the third AND operation outputs a null result, performing an XOR operation between the results of the first AND operation and the results of the second AND operation, and searching, in a single pass, for the one or more error types specified by the configuration mask in any request string component corresponding to a non-null output of the XOR operation, recording results of the search in the results mask, and generating results of the search for the one or more error types specified by the error detection directive.

While executable instructions associated with the above method are described as being stored on a computer-readable medium, it is to be appreciated that executable instructions associated with other example methods described herein may also be stored on a computer-readable medium.

Figure 6:
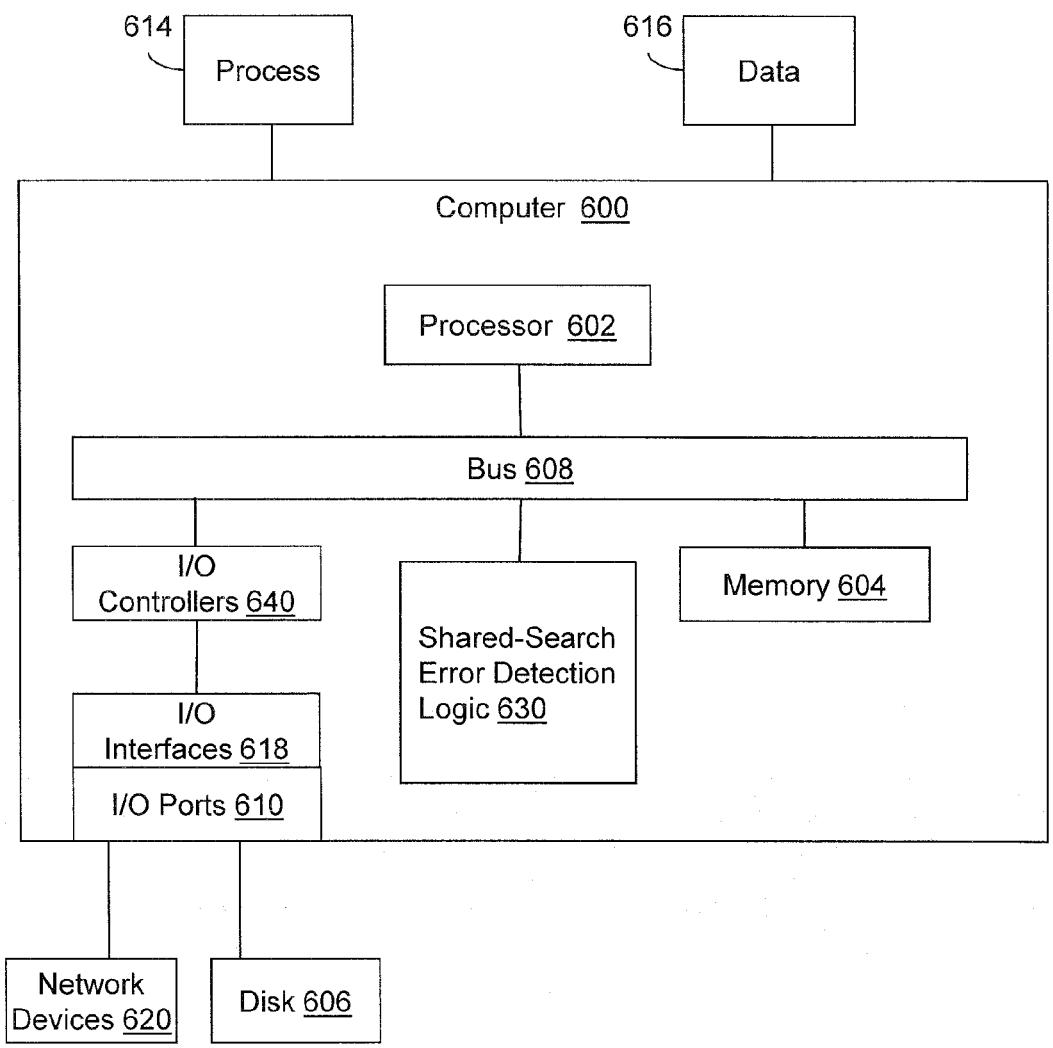
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a shared-search error detection logic 630 configured to facilitate shared-search error detection. In different examples, the logic 630 may be implemented in hardware, software stored as computer executable instructions on a computer-readable medium, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software stored as computer executable instructions on a computer-readable medium, firmware) for receiving a web resource request that includes one or more request strings and means for accessing an error detection directive associated with the web resource request; and means (e.g., hardware, software stored as computer executable instructions on a computer-readable medium, firmware) for determining if a search of a first request string component has been searched for the first type of error.

The means may be implemented, for example, as an ASIC (application specific integrated circuit) programmed to perform shared error searching. The means may also be implemented as computer executable instructions that are presented to computer 600 as data 616 that are temporarily stored in memory 604 and then executed by processor 602.

Logic 630 may also provide means (e.g., hardware, software stored as computer executable instructions on a computer-readable medium, firmware) for returning a previously recorded result of the search of the first request string for the first type of error. The logic may also provide means (e.g., hardware, software stored as computer executable instructions on a computer-readable medium, firmware) for searching, in a single pass, at least a portion of the first request string component for the first type of error and a second type of error. The logic may also provide means (e.g., hardware, software stored as computer executable instructions on a computer-readable medium, firmware) for recording occurrences of the first and second types of errors for responding to subsequent error detection directives for the second type of error, such that a subsequent error detection directive for the second type of error in the first request string component is processed without re-searching the portion of the first request string component already searched with respect to the first error detection directive. The logic may also provide means (e.g., hardware, software stored as computer executable instructions on a computer-readable medium, firmware) for generating results of the search of the first request string component for the first type of error.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM (compact disk) drive, a CD-R (CD recordable) drive, a CD-RW (CD rewriteable) drive, a DVD (digital versatile disk and/or digital video disk) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCI (peripheral component interconnect), PCIE (PCI express), 1394, USB (universal serial bus), Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
receiving, with a processor, a web resource request that includes one or more request string components;
accessing an error detection directive identifying a first type of error to be located in a specified request string component;
where the web resource request includes a URL address string component, a query string component, and a post body string component and where types of errors include a null byte error, a strict encoding error, a double encoding error, or a valid Unicode error;
with the processor, searching, in a single pass, at least a portion of a first request string component in the web resource request that corresponds to the specified request string component for the first type of error and other types of errors;
recording, in a computer-readable medium, occurrences of the first and other types of errors for responding to subsequent error detection directives for the first and other types of errors, such that a subsequent error detection directive for at least one of the first and other types of errors in the first request string component is processed without re-searching the portion of the first request string component already searched with respect to the first error detection directive; and generating results of the search of the first request string component for the first type of error.

2. The computer-implemented method of claim 1 comprising:

prior to searching the first request string component, determining if the first request string component has already been searched for the first type of error; and if a search of the first request string component has been searched for the first type of error, returning, without re-searching the first request string component, a previously recorded result of the search of the first request string component for the first type of error.

3. The computer-implemented method of claim 1 comprising:

accessing a configuration mask that specifies one or more types of errors to be detected in one or more request string components; and if the configuration mask specifies that the first type of error is to be detected in the first request string component, searching, in a single pass, at least a portion of the first request string component for the first error and the others of the one or more types of errors specified for the first request string type component.

4. The computer-implemented method of claim 1 comprising:

recording, in a progress mask associated with the web resource request that maps types of errors to the one or more request string components, an indication that the first request string component has been searched for the first and other error types; and accessing the progress mask associated with the web resource request and if the progress mask records an indication that the first request string component has not been searched for the first error type, searching, in a single pass, at least a portion of the first request string component for the first and other types of errors.

5. The computer-implemented method of claim 4 comprising recording, in an error detection results mask associated with the web resource request that maps the types of errors to the one or more request string components, the results of searching the first request string component for the first and other types of errors.

6. The computer-implemented method of claim 5 comprising returning the result of the search of the first request string component for the first error type that is recorded in the error detection results mask if the error detection progress mask records an indication that the first request string component has already been searched for the first error type.

7. The computer-implemented method of claim 1 where the first error detection directive comprises a request to search at least two specified request string components associated with the first web resource request for the first type of error, and further where a first received of the at least two web source request string components is searched first for the first and other types of errors.

8. A computing system comprising:

a shared-search error detection logic configured to:
    receive a web resource request;
    access a first error detection directive that identifies a first type of format error to be located in a specified request string component;
    where the web resource request includes a URL address string component, a query string component, and a post body string component and where types of errors include a null byte error, a strict encoding error, a double encoding error, or a valid Unicode error; and further where the shared-search error detection logic is configured to determine if a first request string component corresponding to the specified request string type has already been searched in a prior search for the first type of format error; and where the shared-search error detection logic is configured to return previously recorded results of the search of the first request string component for the first type of format error if the first request string component has already been searched in a prior search for the first type of format error.

9. The computing system of claim 8 where the shared-search error detection logic comprises:

means for receiving a web resource request that includes one or more request strings;

means for accessing an error detection directive associated with the web resource request, the first error detection directive identifying a first type of format error to be located in a specified request string component;

means for determining if a search of a first request string component that corresponds to the specified request string component has been searched for the first type of format error; and means for returning a previously recorded result of the search of the first request string component for the first type of format error.

10. The computing system of claim 8 comprising:

a multiple error type search logic configured to search, in a single pass, at least a portion of a first request string component for the first type of format error and other types of format errors;

a multiple error type recording logic configured to record occurrences of the first and other types of format errors for responding to subsequent error detection directives for at least one of the first and other types of format errors; and where the shared-search error detection logic is configured to respond to a subsequent error detection directive for at least one of the first and other types of format errors in the first request string component without re-searching the portion of the first request string already searched with respect to the first error detection directive.

11. The computing system of claim 10 where:

the shared-search error detection logic is configured to maintain a configuration mask that specifies one or more types of format errors to be detected in one or more request string components; and where the multiple error type search logic is configured to search, in a single pass, at least a portion of the first request string component for the one or more types of format errors specified for the first request string component.

12. The computing system of claim 10 where the multiple error type recording logic is configured to maintain a progress mask that is associated with the web resource request, the progress mask recording an indication as to which, if any, of the one or more request string components has been searched for any of the one or more types of format errors.

13. The computing system of claim 10 where the shared-search error detection logic is configured to access a progress mask associated with the first web resource request and if the a progress mask records an indication that the first request string component has not been searched for the first format error type, to search, in a single pass, at least a portion of the first request string component for the first and other types of format errors.

14. The computing system of claim 13 where the multiple error type recording logic is configured to record the results of searching the first request string component for the first and other types of format errors in a results mask associated with the web resource request that maps types of format errors to one or more request string components.

15. The computing system of claim 14 where, if the progress mask is configured to record an indication that the first request string component has been searched for the first format error type, the shared-search error detection logic returns the result of the search of the first request string component for the first format error type that is recorded in the error detection results mask.

16. The computing system of claim 10 where:
the multiple error search logic includes means for searching, in a single pass, at least a portion of the first request string component for the first type of format error and a other types of format errors; and
the multiple error recording logic includes means for recording occurrences of the first and other types of format errors for responding to subsequent error detection directives for at least one of the first and other types of format errors, such that a subsequent error detection directive for the at least one of the first and other types of format errors in the first request string component is processed without re-searching the portion of the first request string component already searched with respect to the first error detection directive.

17. A computer-readable medium storing computer executable instructions that when executed by a computer cause the computer to perform a method, the method comprising:
receiving a web resource request that includes one or more request string components;
accessing a first error detection directive identifying a first type of error to be located in a specified request string component;
where the web resource request includes a URL address string component, a query string component, and a post body string component and where the types of errors include a null byte error, a strict encoding error, a double encoding error, or a valid Unicode error;
searching, in a single pass, at least a portion of a first request string that corresponds to the specified request string component for the first type of error and other types of errors;
recording occurrences of the first and other types of errors for responding to subsequent error detection directives for the first and other types of errors, such that a subsequent error detection directive for at least one of the first and other types of errors in the first request string component is processed without re-searching the portion of the first request string component already searched with respect to the first error detection directive; and
generating results of the search of the first request string component for the first type of error.

18. The computer-readable medium of claim 17 where the method comprises:
prior to searching the first request string component, determining if the first request string component has already been searched for the first type of error; and
if a search of the first request string has been searched for the first type of error, returning, without re-searching the first request string component, a previously recorded result of the search of the first request string component for the first type of error.

19. A computer-readable medium storing computer executable instructions that when executed by a computer cause the computer to perform a method, the method comprising:
receiving an error detection directive associated with a web resource request, the error detection directive specifying one or more request string components to be searched for one or more error types;
performing a first AND operation on the error detection directive and a configuration mask and if the first AND operation outputs a null result, returning a passing result indicating that the one or more request string components meet error detection specifications;
if the first AND operation does not output a null result, performing a second AND operation on the results of the first AND operation and a progress mask and performing a third AND operation on the results of the second AND operation and a results mask and returning a failing result indicating the one or more request string components do not meet error detection requirements if the third AND operation outputs a non-null result; and
if the third AND operation outputs a null result, performing an XOR operation between the results of the first AND operation and the results of the second AND operation, and searching, in a single pass, for the one or more error types specified by the configuration mask in any request string component corresponding to a non-null output of the XOR operation, recording results of the search in the results mask, and generating results of the search for the one or more error types specified by the error detection directive.

20. The computer-readable medium of claim 19 where returning a failing result is performed by issuing a denial of service in response to the web resource request.

21. The computer-readable medium of claim 19 where the instructions comprise returning a failing result when an error is detected by the search for one or more error types specified by the configuration mask in the request strings corresponding to non-null outputs of the XOR operation.

22. The computer-readable medium of claim 19 where returning a passing result is performed by passing the web resource request to a server that is configured to provide access the requested web resource.

23. The computer-readable medium of claim 19 where returning a failing result is performed by logging the negative result and passing the web resource request to a server that is configured to provide access the requested web resource.

* * * * *

UNITED STATES PATENT AND TRADEMARK OFFICE
CERTIFICATE OF CORRECTION

PATENT NO. : 8,516,313 B2  
APPLICATION NO. : 12/816422  
DATED : August 20, 2013  
INVENTOR(S) : Thilagar et al.

Page 1 of 1

It is certified that error appears in the above-identified patent and that said Letters Patent is hereby corrected as shown below:

In the Specification

Column 1, line 46, after "requests" insert -- . --.

In the Claims

Column 12, line 65-66, in Claim 13, delete "if the a progress" and insert -- if the progress --, therefor.

Column 14, line 54, in Claim 22, delete "access the" and insert -- access to the --, therefor.

Column 14, line 58, in Claim 23, delete "access the" and insert -- access to the --, therefor.

Signed and Sealed this  
Tenth Day of December, 2013

Margaret A. Focarino  
*Commissioner for Patents of the United States Patent and Trademark Office*